United States Patent
Nagamune et al.

(10) Patent No.: US 10,611,640 B2
(45) Date of Patent: Apr. 7, 2020

(54) CARBON FILM AND METHOD OF PRODUCING SAME, AND FIBROUS CARBON NANOSTRUCTURE DISPERSION LIQUID AND METHOD OF PRODUCING SAME

(71) Applicant: ZEON CORPORATION, Chiyoda-ku, Tokyo (JP)

(72) Inventors: Tsutomu Nagamune, Tokyo (JP); Mitsugu Uejima, Tokyo (JP); Tomoko Yamagishi, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 261 days.

(21) Appl. No.: 15/574,493

(22) PCT Filed: May 26, 2016

(86) PCT No.: PCT/JP2016/002552
§ 371 (c)(1),
(2) Date: Nov. 16, 2017

(87) PCT Pub. No.: WO2016/189873
PCT Pub. Date: Dec. 1, 2016

(65) Prior Publication Data
US 2018/0127273 A1  May 10, 2018

(30) Foreign Application Priority Data

May 27, 2015 (JP) .................. 2015-107694

(51) Int. Cl.
*C01B 32/162* (2017.01)
*C01B 32/05* (2017.01)
(Continued)

(52) U.S. Cl.
CPC ............ *C01B 32/162* (2017.08); *B82Y 30/00* (2013.01); *C01B 32/05* (2017.08); *C01B 32/154* (2017.08); *C01B 32/17* (2017.08); *C01B 32/178* (2017.08); *B82Y 40/00* (2013.01); *C01B 32/159* (2017.08); *C01B 2202/02* (2013.01)

(58) Field of Classification Search
CPC ... C01B 32/162; C01B 32/178; C01B 32/154; C01B 32/17; C01B 32/05;
(Continued)

(56) References Cited

U.S. PATENT DOCUMENTS

2006/0207931 A1* 9/2006 Liang ................. B01D 67/0046
  210/500.21
2008/0318049 A1  12/2008 Hata et al.
(Continued)

FOREIGN PATENT DOCUMENTS

CN     104098084 A     10/2014
JP     2006-274095    * 10/2006   ............. C09D 17/00
(Continued)

OTHER PUBLICATIONS

Machine translation of JP 2006-274095 to Kimihiko, et al. (Year: 2006).*
(Continued)

*Primary Examiner* — Daniel C. McCracken
(74) *Attorney, Agent, or Firm* — Kenja IP Law PC (57) ABSTRACT

Provided are a carbon film having excellent electrical conductivity and a method of producing this carbon film. The carbon film has a film surface glossiness at 60° of at least 2 and not more than 500. The method of producing the carbon film includes forming a carbon film by removing a solvent from a fibrous carbon nanostructure dispersion liquid containing the solvent and one or more fibrous carbon nanostructures.

9 Claims, 1 Drawing Sheet

(51) Int. Cl.
  *B82Y 30/00* (2011.01)
  *C01B 32/17* (2017.01)
  *C01B 32/154* (2017.01)
  *C01B 32/178* (2017.01)
  *C01B 32/159* (2017.01)
  *B82Y 40/00* (2011.01)

(58) Field of Classification Search
  CPC . C01B 2202/02; C01B 32/159; C01B 32/158; C01B 32/16; C01B 32/164; C01B 32/166; C01B 32/168; C01B 32/172; C01B 32/174; C01B 32/176; C01B 2202/00; C01B 2202/04; C01B 2202/06; C01B 2202/08; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; B82Y 40/00; B82Y 30/00; H01B 1/04
  See application file for complete search history.

(56) References Cited

U.S. PATENT DOCUMENTS

| | | | |
|---|---|---|---|
| 2010/0303706 A1 | 12/2010 | Wallace et al. | |
| 2014/0353556 A1* | 12/2014 | Shigeta | B82Y 30/00 252/511 |
| 2016/0159652 A1 | 6/2016 | Uejima et al. | |
| 2016/0251225 A1 | 9/2016 | Takai et al. | |
| 2017/0121178 A1 | 5/2017 | Shigeta et al. | |

FOREIGN PATENT DOCUMENTS

| | | | |
|---|---|---|---|
| JP | 2006274095 A | 10/2006 | |
| JP | 2010105909 A | 5/2010 | |
| JP | 4621896 B2 | 1/2011 | |
| JP | 2011500488 A | 1/2011 | |
| JP | 2013230951 A | 11/2013 | |
| WO | 2006011655 A1 | 2/2006 | |
| WO | WO 2013/080912 * | 6/2013 | ............ C01B 31/02 |
| WO | 2015015758 A1 | 2/2015 | |
| WO | 2015064772 A1 | 5/2015 | |
| WO | 2015182058 A1 | 12/2015 | |

OTHER PUBLICATIONS

Jul. 5, 2016, International Search Report issued in the International Patent Application No. PCT/JP2016/002552.

Kazuhiko Onodera, "Development of a Wet-type Jet Mill Dedicated to Dispersion of Carbon Nanotubes", Funtai Gijutsu, Jan. 11, 2012, pp. 1121 to 1124, particularly, pp. 1122 to 1123, vol. 4, No. 11.

Nov. 28, 2017, International Preliminary Report on Patentability issued in the International Patent Application No. PCT/JP2016/002552.

* cited by examiner

CARBON FILM AND METHOD OF PRODUCING SAME, AND FIBROUS CARBON NANOSTRUCTURE DISPERSION LIQUID AND METHOD OF PRODUCING SAME

TECHNICAL FIELD

This disclosure relates to a carbon film, a method of producing the carbon film, a fibrous carbon nanostructure dispersion liquid, and a method of producing the fibrous carbon nanostructure dispersion liquid.

BACKGROUND

In recent years, fibrous carbon nanostructures such as carbon nanotubes (hereinafter, also referred to as "CNTs") have been attracting interest as materials having excellent electrical conductivity, thermal conductivity, and mechanical properties.

However, fibrous carbon nanostructures such as CNTs are fine structures having nanometer-size diameters, and thus individual fibrous carbon nanostructures have poor handleability and processability. Accordingly, it has been proposed that, for example, a plurality of CNTs may be aggregated into the shape of a film to form a carbon nanotube film (hereinafter, also referred to as a "CNT film"), which is sometimes referred to as "buckypaper", and this CNT film may be used as a conductive film or the like. More specifically, it has been proposed that a carbon film formed by removing a solvent from a dispersion liquid obtained by mixing the solvent and fibrous carbon nanostructures, such as CNTs, and dispersing the fibrous carbon nanostructures by stirring, or the like may be used as a component (for example, a conductive film or a catalyst layer) of an electrode in a solar cell, touch panel, or the like (for example, refer to PTL 1).

Carbon films obtained through aggregation of fibrous carbon nanostructures into a film shape as described above are attracting interest as film materials having excellent properties in terms of electrical conductivity, thermal conductivity, mechanical properties, and so forth.

CITATION LIST

Patent Literature

PTL 1: JP 2010-105909 A

SUMMARY

Technical Problem

However, a conventional carbon film obtained by removing a solvent from a dispersion liquid that is obtained by dispersing fibrous carbon nanostructures in the solvent simply by stirring or the like has insufficient electrical conductivity and may not be able to display adequate performance as an electrode in a solar cell, touch panel, or the like.

Accordingly, an objective of this disclosure is to provide a carbon film having excellent electrical conductivity and a method of producing this carbon film.

Another objective of this disclosure is to provide a fibrous carbon nanostructure dispersion liquid with which a carbon film having excellent electrical conductivity can be obtained and a method of producing this fibrous carbon nanostructure dispersion liquid.

Solution to Problem

The inventors conducted diligent investigation to achieve the objectives set forth above. As a result, the inventors discovered that a carbon film having a specific surface glossiness has excellent electrical conductivity and that a carbon film having excellent electrical conductivity can be obtained using a fibrous carbon nanostructure dispersion liquid for which a ratio of light absorbance by a supernatant before and after centrifugal separation under specific conditions is a specific value or more. The inventors completed the present disclosure based on these discoveries.

Specifically, this disclosure aims to advantageously solve the problems set forth above by disclosing a carbon film having a surface glossiness at 60° of at least 2 and not more than 500. The carbon film set forth above has excellent electrical conductivity.

The presently disclosed carbon film preferably comprises one or more fibrous carbon nanostructures. As a result of the carbon film containing fibrous carbon nanostructures, surface glossiness of the carbon film can be further increased and electrical conductivity of the carbon film can be further improved.

In the presently disclosed carbon film, the fibrous carbon nanostructures preferably exhibit a convex upward shape in a t-plot obtained from an adsorption isotherm. As a result of the carbon film containing fibrous carbon nanostructures that exhibit a convex upward shape in a t-plot, electrical conductivity of the carbon film can be further improved.

Moreover, this disclosure aims to advantageously solve the problems set forth above by disclosing a method of producing a carbon film, which is a method for producing the presently disclosed carbon film set forth above, comprising forming a carbon film by removing a solvent from a fibrous carbon nanostructure dispersion liquid containing the solvent and one or more fibrous carbon nanostructures. Through the presently disclosed method of producing a carbon film, the presently disclosed carbon film having excellent electrical conductivity can be obtained.

In the presently disclosed method of producing a carbon film, the fibrous carbon nanostructure dispersion liquid preferably has a dispersion rate (%) of 80% or more as determined by B/A×100, where A is light absorbance of the fibrous carbon nanostructure dispersion liquid and B is light absorbance of a supernatant obtained upon subjecting the fibrous carbon nanostructure dispersion liquid to centrifugal separation for 1 hour at 10,000 G. As a result of the dispersion rate (%) of the fibrous carbon nanostructure dispersion liquid being 80% or more, dispersibility of the fibrous carbon nanostructures in the dispersion liquid is extremely high, and a carbon film having excellent electrical conductivity can be obtained through carbon film formation using these fibrous carbon nanostructures having excellent dispersibility.

In the presently disclosed method of producing a carbon film, the fibrous carbon nanostructures preferably exhibit a convex upward shape in a t-plot obtained from an adsorption isotherm. A carbon film having even better electrical conductivity can be obtained using fibrous carbon nanostructures such as described above.

Furthermore, this disclosure aims to advantageously solve the problems set forth above by disclosing a fibrous carbon nanostructure dispersion liquid comprising one or more fibrous carbon nanostructures and a solvent, wherein the fibrous carbon nanostructure dispersion liquid has a dispersion rate (%) of 80% or more as determined by B/A×100, where A is light absorbance of the fibrous carbon nanostructure dispersion liquid and B is light absorbance of a supernatant obtained upon subjecting the fibrous carbon nanostructure dispersion liquid to centrifugal separation for 1 hour at 10,000 G. As a result of the dispersion rate (%) determined by B/A×100 being 80% or more, dispersibility of the fibrous carbon nanostructures in the dispersion liquid is extremely high, and a carbon film having excellent electrical conductivity can be obtained through carbon film formation using these fibrous carbon nanostructures having excellent dispersibility.

In the presently disclosed fibrous carbon nanostructure dispersion liquid, the fibrous carbon nanostructures preferably exhibit a convex upward shape in a t-plot obtained from an adsorption isotherm. A carbon film having even better electrical conductivity can be obtained by using fibrous carbon nanostructures such as described above in the fibrous carbon nanostructure dispersion liquid.

The presently disclosed fibrous carbon nanostructure dispersion liquid preferably further comprises a dispersant from a viewpoint of increasing dispersibility of the fibrous carbon nanostructures and obtaining a carbon film having high free-standing ability and electrical conductivity.

Also, this disclosure aims to advantageously solve the problems set forth above by disclosing a method of producing a fibrous carbon nanostructure dispersion liquid comprising obtaining a fibrous carbon nanostructure dispersion liquid by performing dispersion treatment in which pressure is applied to a coarse dispersion liquid obtained through addition of one or more fibrous carbon nanostructures to a solvent such as to feed the coarse dispersion liquid into a narrow tubular flow path and shear force is imparted on the coarse dispersion liquid to disperse the fibrous carbon nanostructures, wherein the dispersion treatment includes first dispersion treatment in which a pressure of 60 MPa to 250 MPa is applied to the coarse dispersion liquid and second dispersion treatment, performed after the first dispersion treatment, in which a pressure of 5 MPa to 30 MPa is applied to the coarse dispersion liquid, and the first dispersion treatment has an average dispersion treatment count θ of 5 to 30 and the second dispersion treatment has an average dispersion treatment count θ of 1 to 20. A carbon film having excellent electrical conductivity can be obtained using a fibrous carbon nanostructure dispersion liquid produced in this manner.

Moreover, this disclosure aims to advantageously solve the problems set forth above by disclosing a method of producing a fibrous carbon nanostructure dispersion liquid comprising obtaining a fibrous carbon nanostructure dispersion liquid by performing dispersion treatment in which pressure is applied to a coarse dispersion liquid obtained through addition of one or more fibrous carbon nanostructures to a solvent such as to feed the coarse dispersion liquid into a narrow tubular flow path and shear force is imparted on the coarse dispersion liquid to disperse the fibrous carbon nanostructures, wherein in the dispersion treatment, a pressure of 50 MPa to 250 MPa is applied to the coarse dispersion liquid, back pressure is applied to the coarse dispersion liquid on which shear force has been imparted, and back pressure of the coarse dispersion liquid on which shear force has been imparted is reduced in at least two steps, and the dispersion treatment has an average dispersion treatment count θ of 3 to 20. A carbon film having excellent electrical conductivity can be obtained using a fibrous carbon nanostructure dispersion liquid produced in this manner.

Advantageous Effect

According to this disclosure, it is possible to provide a carbon film having excellent electrical conductivity and a method of producing this carbon film.

Moreover, according to this disclosure, it is possible to provide a fibrous carbon nanostructure dispersion liquid with which a carbon film having excellent electrical conductivity can be obtained and a method of producing this fibrous carbon nanostructure dispersion liquid.

BRIEF DESCRIPTION OF THE DRAWING

In the accompanying drawing.

DETAILED DESCRIPTION

The following provides a detailed description of embodiments of this disclosure.

The presently disclosed carbon film can be produced by the presently disclosed method of producing a carbon film. Moreover, the presently disclosed fibrous carbon nanostructure dispersion liquid can be produced by the presently disclosed method of producing a fibrous carbon nanostructure dispersion liquid and can be used in production of the presently disclosed carbon film. Furthermore, the presently disclosed fibrous carbon nanostructure dispersion liquid can be used as a fibrous carbon nanostructure dispersion liquid in the presently disclosed method of producing a carbon film.

(Carbon Film)

The presently disclosed carbon film has a film surface glossiness at 60° of at least 2 and not more than 500. By setting the film surface glossiness of the carbon film at 60° as at least 2 and not more than 500, the carbon film can be provided with high electrical conductivity. The reason that a carbon film having a surface glossiness at 60° of at least 2 and not more than 500 displays excellent electrical conductivity is not clear. However, it is presumed that a carbon film having a glossiness in the range set forth above is similar in nature to a metal and that these properties are achieved due to a carbon material being densely and homogeneously entangled to form a fine reticulated structure, resulting in improvement of electrical conductivity.

From the same viewpoint, the film surface glossiness of the presently disclosed carbon film at 60° is preferably 4 or more, more preferably 10 or more, and even more preferably 15 or more. Moreover, the film surface glossiness of the presently disclosed carbon film at 60° is 500 or less and may, as necessary, be set as 200 or less, 150 or less, 40 or less, or 30 or less.

The glossiness of the carbon film can be measured in accordance with JIS Z8741 with an incident angle of 60°. The glossiness of the carbon film can be adjusted by, for example, altering the type and amount of carbon material used to form the carbon film or altering the production method of a dispersion liquid used in production of the carbon film.

The presently disclosed carbon film may contain any carbon material so long as the surface glossiness is within the range set forth above. Among such carbon materials, fibrous carbon materials and particularly fibrous carbon nanostructures are preferable for inclusion. Through inclusion of fibrous carbon nanostructures, the carbon film can be provided with higher surface glossiness and electrical conductivity of the carbon film can be further improved.

<Fibrous Carbon Nanostructures>

Examples of fibrous carbon nanostructures that may be used include, but are not specifically limited to, carbon nanotubes (CNTs) and vapor-grown carbon fibers. One type of fibrous carbon nanostructure may be used individually, or two or more types of fibrous carbon nanostructures may be used together.

Of such examples, fibrous carbon nanostructures including CNTs are more preferable for use as the fibrous carbon nanostructures. Electrical conductivity and free-standing ability of the resultant carbon film can be increased through use of CNT-containing fibrous carbon nanostructures.

The CNT-containing fibrous carbon nanostructures that can suitably be used as the fibrous carbon nanostructures may be CNTs only or may be a mixture of CNTs with fibrous carbon nanostructures other than CNTs.

The CNTs included among the fibrous carbon nanostructures are not specifically limited and may be single-walled carbon nanotubes and/or multi-walled carbon nanotubes. However, the CNTs are preferably carbon nanotubes having one to five walls, and are more preferably single-walled carbon nanotubes. The free-standing ability of the carbon film can be further improved through use of single-walled carbon nanotubes compared to a case in which multi-walled carbon nanotubes are used.

The fibrous carbon nanostructures are preferably carbon nanostructures for which a ratio ($3\sigma/Av$) of the diameter standard deviation ($\sigma$) of the fibrous carbon nanostructures multiplied by 3 relative to the average diameter (Av) of the fibrous carbon nanostructures is more than 0.20 and less than 0.60, are more preferably carbon nanostructures for which $3\sigma/Av$ is more than 0.25, and are even more preferably carbon nanostructures for which $3\sigma/Av$ is more than 0.50. The strength and free-standing ability of the resultant carbon film can be further increased through use of fibrous carbon nanostructures for which $3\sigma/Av$ is more than 0.20 and less than 0.60.

The "average diameter (Av) of the fibrous carbon nano structures" and the "diameter standard deviation ($\sigma$: sample standard deviation) of the fibrous carbon nanostructures" can each be determined by measuring the diameters (external diameters) of 100 randomly selected fibrous carbon nanostructures using a transmission electron microscope. The average diameter (Av) and standard deviation ($\sigma$) of the fibrous carbon nanostructures may be adjusted by altering the production method or production conditions of the fibrous carbon nanostructures, or by combining a plurality of types of fibrous carbon nanostructures obtained by different production methods.

The fibrous carbon nanostructures that are used typically take a normal distribution when a plot is made of diameter measured as described above on a horizontal axis and probability density on a vertical axis, and a Gaussian approximation is made.

Moreover, it is preferable that the fibrous carbon nanostructures have a radial breathing mode (RBM) peak when evaluated by Raman spectroscopy. It should be noted that an RBM is not present in the Raman spectrum of fibrous carbon nanostructures composed only of multi-walled carbon nanotubes having three or more walls.

In a Raman spectrum of the fibrous carbon nanostructures, a ratio of G band peak intensity relative to D band peak intensity (G/D ratio) is preferably at least 1 and not more than 20. The strength and free-standing ability of the resultant carbon film can be further increased when the G/D ratio is at least 1 and not more than 20.

The average diameter (Av) of the fibrous carbon nanostructures is preferably 0.5 nm or more, and more preferably 1 nm or more, and is preferably 15 nm or less, and more preferably 10 nm or less. When the average diameter (Av) of the fibrous carbon nanostructures is 0.5 nm or more, aggregation of the fibrous carbon nanostructures can be inhibited, and in a situation in which the carbon film is produced using a fibrous carbon nanostructure dispersion liquid, dispersibility of the fibrous carbon nanostructures in the dispersion liquid can be increased. Moreover, the strength of the resultant carbon film can be sufficiently increased when the average diameter (Av) of the fibrous carbon nanostructures is 15 nm or less. Therefore, the strength and free-standing ability of the resultant carbon film can be further increased by setting the average diameter (Av) of the fibrous carbon nanostructures within any of the ranges set forth above.

The fibrous carbon nanostructures preferably have an average structure length at the time of synthesis of at least 100 μm and not more than 5,000 μm. It is preferable that the average structure length at the time of synthesis is 5,000 μm or less because fibrous carbon nanostructures that have a long structure length at the time of synthesis are more susceptible to damage by breaking, severing, or the like during dispersing.

The BET specific surface area of the fibrous carbon nanostructures is preferably 400 $m^2/g$ or more, and more preferably 800 $m^2/g$ or more, and is preferably 2,500 $m^2/g$ or less, and more preferably 1,200 $m^2/g$ or less. The strength and free-standing ability of the resultant carbon film can be further increased when the BET specific surface area of the fibrous carbon nanostructures is 400 $m^2/g$ or more. Moreover, in a situation in which the carbon film is produced using a fibrous carbon nanostructure dispersion liquid, dispersibility of the fibrous carbon nanostructures in the dispersion liquid can be increased when the BET specific surface area of the fibrous carbon nanostructures is 2,500 $m^2/g$ or less.

In this disclosure, "BET specific surface area" refers to the nitrogen adsorption specific surface area measured by the BET method.

The fibrous carbon nanostructures may be obtained by the subsequently described super growth method as an aggregate (aligned aggregate) that, on a substrate having a catalyst layer for carbon nanotube growth at the surface thereof, is aligned roughly perpendicularly to the substrate. In this situation, it is preferable that the mass density of the fibrous carbon nanostructures as the aggregate is at least 0.002 $g/cm^3$ and not more than 0.2 $g/cm^3$. In a situation in which the carbon film is produced using a fibrous carbon nanostructure dispersion liquid, the fibrous carbon nanostructures can be homogeneously dispersed in the dispersion liquid when this mass density is 0.2 $g/cm^3$ or less because binding between the fibrous carbon nanostructures in liquid is weak. Moreover, a mass density of 0.002 $g/cm^3$ or more makes the fibrous carbon nanostructures easier to handle by improving the unity of the fibrous carbon nanostructures and preventing the fibrous carbon nanostructures from becoming unbound.

The fibrous carbon nanostructures preferably include pores. Moreover, the fibrous carbon nanostructures preferably include micropores having a pore diameter of less than 2 nm, and the amount of these micropores in terms of micropore volume determined by the following method is preferably 0.40 mL/g or more, more preferably 0.43 mL/g or more, and even more preferably 0.45 mL/g or more, and normally has an upper limit of approximately 0.65 mL/g.

When the fibrous carbon nanostructures include micropores as described above, aggregation of the fibrous carbon nanostructures in liquid can be inhibited, and the strength and free-standing ability of the resultant carbon film can be further increased. The micropore volume can be adjusted, for example, through appropriate alteration of the production method and production conditions of the fibrous carbon nanostructures.

Herein, "micropore volume (Vp)" can be calculated from equation (I)—$Vp=(V/22,414)\times(M/\rho)$—by measuring a nitrogen adsorption isotherm of the fibrous carbon nanostructures at liquid nitrogen temperature (77 K) and by setting an amount of adsorbed nitrogen at a relative pressure of $P/P0=0.19$ as V. It should be noted that P is a measured pressure at adsorption equilibrium, P0 is a saturated vapor pressure of liquid nitrogen at time of measurement, and, in equation (I), M is a molecular weight of 28.010 of the adsorbate (nitrogen), and $\rho$ is a density of 0.808 g/cm$^3$ of the adsorbate (nitrogen) at 77 K. The micropore volume can be measured, for example, using a BELSORP®-mini (BELSORP is a registered trademark in Japan, other countries, or both) produced by Bel Japan Inc.

The fibrous carbon nanostructures preferably exhibit a convex upward shape in a t-plot obtained from an adsorption isotherm. Moreover, it is more preferable that the fibrous carbon nanostructures include CNTs having not undergone opening treatment and exhibit a convex upward shape in a t-plot. The carbon film can be provided with even better electrical conductivity through inclusion of fibrous carbon nanostructures that exhibit a convex upward shape in a t-plot as described above.

The "t-plot" can be obtained from an adsorption isotherm of the fibrous carbon nanostructures measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is calculated from a known standard isotherm of average adsorbed nitrogen gas layer thickness t plotted against relative pressure P/P0, and the above-described conversion is performed to obtain a t-plot for the fibrous carbon nanostructures (t-plot method of de Boer et al.).

In the case of a material having pores at the surface, growth of the adsorbed layer of nitrogen gas is categorized into the following processes (1) to (3). The gradient of the t-plot changes in accordance with the processes (1) to (3).

(1) A process in which a single molecular adsorption layer is formed over the entire surface by nitrogen molecules (2) A process in which a multi-molecular adsorption layer is formed and is accompanied by capillary condensation filling of pores (3) A process in which a multi-molecular adsorption layer is formed at a surface that appears to be non-porous due to the pores being filled by nitrogen In a convex upward shaped t-plot, the plot is on a straight line passing through the origin in a region in which the average adsorbed nitrogen gas layer thickness t is small, but, as t increases, the plot deviates downward from the straight line. When fibrous carbon nanostructures exhibit the shape described above in a t-plot, this indicates that the fibrous carbon nanostructures have a large internal specific surface area as a proportion relative to total specific surface area and that there are a large number of openings in carbon nanostructures constituting the fibrous carbon nanostructures.

A bending position of the t-plot for the fibrous carbon nanostructures is preferably within a range of $0.2 \leq t$ (nm) $\leq 1.5$, more preferably within a range of $0.45 \leq t$ (nm) $\leq 1.5$, and even more preferably within a range of $0.55 \leq t$ (nm) $\leq 1.0$.

Note that the "bending position" is the intersection of a linear approximation A for the process (1) and a linear approximation B for the process (3).

A ratio (S2/S1) of the internal specific surface area S2 of the fibrous carbon nanostructures relative to the total specific surface area S1 of the fibrous carbon nanostructures obtained from the t-plot is preferably at least 0.05 and not more than 0.30.

No specific limitations are placed on the total specific surface area S1 and the internal specific surface area S2 of the fibrous carbon nanostructures, but, individually, S1 is preferably at least 400 m$^2$/g and not more than 2,500 m$^2$/g, and more preferably at least 800 m$^2$/g and not more than 1,200 m$^2$/g, whereas S2 is preferably at least 30 m$^2$/g and not more than 540 m$^2$/g.

The total specific surface area S1 and the internal specific surface area S2 of the fibrous carbon nanostructures can be determined from the t-plot for the fibrous carbon nanostructures. Specifically, the total specific surface area S1 can be determined from the gradient of the linear approximation for the process (1) and the external specific surface area S3 can be determined from the gradient of the linear approximation for the process (3). The internal specific surface area S2 can then be calculated by subtracting the external specific surface area S3 from the total specific surface area S1.

Measurement of an adsorption isotherm of the fibrous carbon nanostructures, preparation of a t-plot, and calculation of total specific surface area S1 and internal specific surface area S2 based on t-plot analysis can be performed, for example, using a BELSORP®-mini, which is a commercially available measurement device produced by Bel Japan Inc.

The fibrous carbon nanostructures set forth above can, for example, be efficiently produced in accordance with a method (super growth method; refer to WO 2006/011655 A1) in which, during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve the catalytic activity of the catalyst layer. Hereinafter, carbon nanotubes obtained as fibrous carbon nanostructures by the super growth method are also referred to as "SGCNTs".

The fibrous carbon nanostructures produced by the super growth method may be composed of SGCNTs only, or may be composed of SGCNTs and non-cylindrical carbon nanostructures. Specifically, the fibrous carbon nanostructures may include single-walled or multi-walled flattened cylinder-shaped carbon nanostructures (hereinafter, also referred to as "graphene nanotapes") having a tape-shaped section at which inner walls are in proximity or adhered to each other along the entire length.

A GNT is presumed to be a material in which a tape-shaped section at which inner walls are in proximity or adhered to each other is formed along the entire length from the time of synthesis and in which a six-membered ring network of carbon is formed in a flattened cylindrical shape. It is possible to confirm that a GNT has a flattened cylindrical shape and that a tape-shaped section at which inner walls are in proximity or adhered to each other is present in the GNT by, for example, sealing the GNT in a quartz tube with fullerenes (C60), obtaining a fullerene-inserted GNT through heat treatment under reduced pressure (fullerene insertion treatment), and observing the fullerene-inserted GNT using a transmission electron microscope (TEM) to determine that a section where fullerenes are not inserted (tape-shaped section) is present.

The shape of the GNT is preferably a shape having a tape-shaped section at a width direction central portion, more preferably a shape such that a cross-section perpendicular to an extension direction (axial line direction) of the GNT has a shape in which a maximum dimension in a direction perpendicular to a longitudinal direction of the cross-section is larger in proximity to both longitudinal direction ends of the cross-section than in proximity to a central portion in the longitudinal direction of the cross-section, and particularly preferably a dumbbell shape.

Herein, with regards to the cross-sectional shape of the GNT, "in proximity to a central portion in the longitudinal direction of the cross-section" refers to a region within 30% of the longitudinal direction width of the cross-section from a longitudinal central line in the cross-section (line that passes through the longitudinal direction center of the cross-section, perpendicularly to a longitudinal direction line), and "in proximity to both longitudinal direction ends of the cross-section" refers to regions that are further outward in the longitudinal direction than "in proximity to a central portion in the longitudinal direction of the cross-section".

Note that fibrous carbon nanostructures including GNTs as non-cylindrical carbon nanostructures can be obtained by, in synthesis of CNTs by the super growth method using a substrate having a catalyst layer at the surface thereof, forming the substrate having the catalyst layer at the surface thereof (hereinafter, also referred to as a "catalyst substrate") by a specific method. Specifically, fibrous carbon nanostructures including GNTs can be obtained by applying an application liquid A containing an aluminum compound onto a substrate and drying the application liquid A that has been applied to form an aluminum thin film (catalyst supporting layer) on the substrate, subsequently applying an application liquid B containing an iron compound onto the aluminum thin film and drying the application liquid B that has been applied at 50° C. or lower to form an iron thin film (catalyst layer) on the aluminum thin film, and then using the catalyst substrate obtained in this manner to synthesize CNTs by the super growth method.

<Composition and Properties of Carbon Film>

In addition to having a glossiness within a specific range, the carbon film set forth above preferably has the following composition and properties.

[Fibrous Carbon Nanostructure Content]

It is preferable that 75 mass % or more of the presently disclosed carbon film is composed by fibrous carbon nanostructures and more preferable that the carbon film does not contain components other than unavoidable impurities that are mixed in during production. When the content of fibrous carbon nanostructures is 75 mass % or more, properties of the fibrous carbon nanostructures can be favorably displayed and properties such as electrical conductivity can be sufficiently increased. From the same viewpoint, it is preferable that 75 mass % or more of the presently disclosed carbon film is composed by CNTs.

[Density]

The density of the presently disclosed carbon film is preferably 0.4 g/cm$^3$ or more, and more preferably 0.6 g/cm$^3$ or more, and is preferably 1.0 g/cm$^3$ or less.

The density of the presently disclosed carbon film can be determined by measuring the mass, area, and thickness of the carbon film, and then dividing the mass of the carbon film by its volume.

[Free-standing Ability]

The presently disclosed carbon film is preferably a free-standing film that can maintain its shape as a film even in the absence of a support. Specifically, it is more preferable that the presently disclosed carbon film can maintain its shape as a film without a support when of a size of 10 nm to 3 μm in thickness and 1 mm$^2$ to 100 cm$^2$ in area.

(Use of Carbon Film)

The presently disclosed carbon film is particularly suitable for use as a conductive film of a solar cell, touch panel, or the like.

Moreover, the presently disclosed carbon film can be used in the same state as formed on a film formation substrate or may be separated from the film formation substrate for use. Note that the presently disclosed carbon film may optionally be stacked with a known functional layer, such as an overcoating layer, and then be used in various products. Stacking of a functional layer, such as an overcoating layer, on the carbon film can be performed by a known method.

<Touch Panel>

In one specific example, the presently disclosed carbon film may be formed on a transparent substrate and may suitably be used as a conductive layer forming a touch sensor of a touch panel, such as a capacitive touch panel.

<Solar Cell>

The presently disclosed carbon film can also be used as a conductive layer or catalyst layer included in an electrode of a solar cell, such as a dye-sensitized solar cell. More specifically, the presently disclosed carbon film can be used as a conductive layer included in a photoelectrode of a dye-sensitized solar cell, or as a conductive layer and/or catalyst layer included in a counter electrode (catalyst electrode) of a dye-sensitized solar cell.

(Method of Producing Carbon Film)

One major feature of the presently disclosed method of producing a carbon film is inclusion of forming a carbon film by removing a solvent from a fibrous carbon nanostructure dispersion liquid containing the solvent and one or more fibrous carbon nanostructures (film formation step). Through the presently disclosed method of producing a carbon film, the presently disclosed carbon film set forth above having excellent electrical conductivity can be obtained.

<Fibrous Carbon Nanostructure Dispersion Liquid>

The fibrous carbon nanostructure dispersion liquid used in the presently disclosed method of producing a carbon film is a mixture that contains one or more fibrous carbon nanostructures and a solvent.

From a viewpoint of facilitating production of a carbon film having high surface glossiness and excellent electrical conductivity, the fibrous carbon nanostructure dispersion liquid that is used is preferably a fibrous carbon nanostructure dispersion liquid produced by the presently disclosed method of producing a fibrous carbon nanostructure dispersion liquid described further below.

[Fibrous Carbon Nanostructures]

No specific limitations are placed on the fibrous carbon nanostructures contained in the fibrous carbon nanostructure dispersion liquid and any of the fibrous carbon nanostructures previously described in relation to the presently disclosed carbon film may be used. In particular, it is preferable that the fibrous carbon nanostructures used in the presently disclosed method of producing a carbon film exhibit a convex upward shape in a t-plot obtained from an adsorption isotherm. A carbon film having even better electrical conductivity can be obtained when such fibrous carbon nanostructures are used.

Note that details pertaining to the "t-plot" are the same as previously described in relation to the presently disclosed carbon film.

[Solvent]

Examples of the solvent contained in the fibrous carbon nanostructure dispersion liquid (i.e., the dispersion medium of the fibrous carbon nanostructures) include, but are not specifically limited to, water; alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide-based polar organic solvents such as N,N-dimethylformamide and N-methylpyrrolidone; and aromatic hydrocarbons such as toluene, xylene, chlorobenzene, o-dichlorobenzene, and p-dichlorobenzene. One of these solvents may be used individually, or two or more of these solvents may be used together.

[Properties of Fibrous Carbon Nanostructure Dispersion Liquid]

The fibrous carbon nanostructure dispersion liquid used in the presently disclosed method of producing a carbon film preferably has a dispersion rate (%) of 80% or more, more preferably 85% or more, even more preferably 90% or more, and particularly preferably 95% or more. The dispersion rate (%) is determined by B/A×100, where A is the light absorbance of the dispersion liquid and B is the light absorbance B of a supernatant obtained upon subjecting the dispersion liquid to centrifugal separation for 1 hour at 10,000 G. When the dispersion rate (%) determined by B/A×100 is 80% or more as described above, dispersibility of the fibrous carbon nanostructures in the dispersion liquid is extremely high, and a carbon film having excellent electrical conductivity can be obtained through carbon film formation using these fibrous carbon nanostructures having excellent dispersibility.

The light absorbance can be measured, for example, with an optical path length of 1 mm and a wavelength of 500 nm.

<Film Formation Step>

In the film formation step of the presently disclosed method of producing a carbon film, a carbon film is formed by removing the solvent from the above-described fibrous carbon nanostructure dispersion liquid.

Specifically, in the film formation step, a carbon film may be formed, for example, by removing the solvent from the fibrous carbon nanostructure dispersion liquid through either of the following methods (A) and (B).

(A) A method in which the fibrous carbon nanostructure dispersion liquid is applied onto a film formation substrate and subsequently dried (B) A method in which the fibrous carbon nanostructure dispersion liquid is filtered using a porous film formation substrate and the resultant filtration residue is dried

[Film Formation Substrate]

The film formation substrate that is used is not specifically limited and a known substrate may be used in accordance with the intended use of the produced carbon film.

Specifically, the film formation substrate onto which the fibrous carbon nanostructure dispersion liquid is applied in method (A) may be a resin substrate, a glass substrate, or the like. Examples of resin substrates that can be used include substrates made from polyethylene terephthalate (PET), polyethylene naphthalate (PEN), polytetrafluoroethylene (PTFE), polyimides, polyphenylene sulfide, aramids, polypropylene, polyethylene, polylactic acid, polyvinyl chloride, polycarbonates, polymethyl methacrylate, alicyclic acrylic resins, cycloolefin resins, and triacetyl cellulose. Examples of glass substrates that can be used include a substrate made from normal soda glass.

The film formation substrate through which the fibrous carbon nanostructure dispersion liquid is filtered in method (B) may be filter paper or a porous sheet made from cellulose, nitrocellulose, alumina, or the like.

[Application]

Application of the fibrous carbon nanostructure dispersion liquid onto the film formation substrate in method (A) can be performed by a commonly known application method. Specific examples of application methods that can be used include dipping, roll coating, gravure coating, knife coating, air knife coating, roll knife coating, die coating, screen printing, spray coating, and gravure offset.

[Filtration]

Filtration of the fibrous carbon nanostructure dispersion liquid using the film formation substrate in method (B) can be performed by a commonly known filtration method. Specific examples of filtration methods that can be used include natural filtration, vacuum filtration, pressure filtration, and centrifugal filtration.

[Drying]

Drying of the fibrous carbon nanostructure dispersion liquid applied onto the film formation substrate in method (A) or of the filtration residue obtained in method (B) may be performed by a commonly known drying method. Examples of drying methods that can be used include hot-air drying, vacuum drying, hot-roll drying, and infrared irradiation. Although no specific limitations are placed on the drying temperature and time, the drying temperature is normally from room temperature to 200° C. and the drying time is normally from 0.1 minutes to 150 minutes.

<After-treatment of Carbon Film>

The carbon film formed as described above normally contains the components that were contained in the fibrous carbon nanostructure dispersion liquid in the same ratio as in the fibrous carbon nanostructure dispersion liquid. In a case in which a dispersant is added to the fibrous carbon nanostructure dispersion liquid in the presently disclosed method of producing a carbon film, the carbon film formed in the film formation step may optionally be washed to remove the dispersant from the carbon film. Properties of the carbon film such as electrical conductivity can be further increased by removing the dispersant from the carbon film.

Washing of the carbon film can be performed by bringing the carbon film into contact with a solvent in which the dispersant dissolves so that the dispersant in the carbon film elutes into the solvent. The solvent in which the dispersant in the carbon film is soluble is not specifically limited and may be any of the previously described solvents that can be used as the solvent of the fibrous carbon nanostructure dispersion liquid. Note that it is preferable to use the same solvent as the solvent of the fibrous carbon nanostructure dispersion liquid. Contacting of the carbon film and the solvent may be performed by immersing the carbon film in the solvent or by applying the solvent onto the carbon film. Moreover, the carbon film may be dried by a known method after the washing.

In the presently disclosed method of producing a carbon film, the carbon film that is formed in the film formation step may optionally be subjected to pressing to further increase the density of the carbon film. However, from a viewpoint of suppressing the negative impact on properties due to damage or breaking of the fibrous carbon nanostructures, it is preferable that the pressing pressure is less than 3 MPa in a case in which pressing is performed, and more preferable that pressing is not performed.

(Fibrous Carbon Nanostructure Dispersion Liquid)

The presently disclosed fibrous carbon nanostructure dispersion liquid contains one or more fibrous carbon nanostructures and a solvent, and may further contain a dispersant as necessary. The presently disclosed fibrous carbon nanostructure dispersion liquid has a dispersion rate (%) of 80% or more as determined by B/A×100, where A is the light absorbance of the dispersion liquid and B is the light absorbance of a supernatant obtained upon subjecting the dispersion liquid to centrifugal separation for 1 hour at 10,000 G. This dispersion rate (%) is preferably 85% or more, more preferably 90% or more, and even more preferably 95% or more. When the dispersion rate (%) determined by B/A×100 is 80% or more as described above, dispersibility of the fibrous carbon nanostructures in the dispersion liquid is extremely high, and when these fibrous carbon nanostructures having excellent dispersibility are used to form a carbon film, a carbon film having excellent electrical conductivity can be obtained.

The light absorbance can be measured, for example, with an optical path length of 1 mm and a wavelength of 500 nm.

<Fibrous Carbon Nanostructures>

No specific limitations are placed on the fibrous carbon nanostructures contained in the fibrous carbon nanostructure dispersion liquid and any of the fibrous carbon nanostructures previously described in relation to the presently disclosed carbon film may be used. In particular, it is preferable that the fibrous carbon nanostructures contained in the fibrous carbon nanostructure dispersion liquid exhibit a convex upward shape in a t-plot obtained from an adsorption isotherm. A carbon film having even better electrical conductivity can be obtained when fibrous carbon nanostructures such as described above are used in the fibrous carbon nanostructure dispersion liquid.

Note that details pertaining to the "t-plot" are the same as previously described in relation to the presently disclosed carbon film.

<Solvent>

The solvent contained in the fibrous carbon nanostructure dispersion liquid (dispersion medium of fibrous carbon nanostructures) is not specifically limited and any of the solvents previously described in relation to the presently disclosed method of producing a carbon film may be used.

<Other Additives>

Commonly known additives such as dispersants, fillers, stabilizers, colorants, charge control agents, and lubricants may be added to the presently disclosed fibrous carbon nanostructure dispersion liquid depending on the intended use of a carbon film that is to be produced. In particular, it is preferable that the presently disclosed fibrous carbon nanostructure dispersion liquid further contains a dispersant from a viewpoint of increasing dispersibility of the fibrous carbon nanostructures and obtaining a carbon film having high free-standing ability and electrical conductivity.

[Dispersant]

No specific limitations are placed on dispersants that may suitably be contained in the fibrous carbon nanostructure dispersion liquid other than being capable of dispersing the fibrous carbon nanostructures and being soluble in the solvent in which the fibrous carbon nanostructures are dispersed. Examples of dispersants that can be used include surfactants, synthetic polymers, and natural polymers.

Examples of surfactants that can be used include sodium dodecylsulfonate, sodium deoxycholate, sodium cholate, and sodium dodecylbenzenesulfonate.

Examples of synthetic polymers that can be used include polyether diols, polyester diols, polycarbonate diols, polyvinyl alcohol, partially saponified polyvinyl alcohol, acetoacetyl group-modified polyvinyl alcohol, acetal group-modified polyvinyl alcohol, butyral group-modified polyvinyl alcohol, silanol group-modified polyvinyl alcohol, ethylene-vinyl alcohol copolymers, ethylene-vinyl alcohol-vinyl acetate copolymer resins, dimethylaminoethyl acrylate, dimethylaminoethyl methacrylate, acrylic resins, epoxy resins, modified epoxy resins, phenoxy resins, modified phenoxy resins, phenoxy ether resins, phenoxy ester resins, fluororesins, melamine resins, alkyd resins, phenolic resins, polyacrylamide, polyacrylic acid, polystyrene sulfonic acid, polyethylene glycol, and polyvinyl pyrrolidone.

Examples of natural polymers that can be used include polysaccharides such as starch, pullulan, dextran, dextrin, guar gum, xanthan gum, amylose, amylopectin, alginic acid, gum Arabic, carrageenan, chondroitin sulfate, hyaluronic acid, curdlan, chitin, chitosan, cellulose, and salts and derivatives thereof. One of these examples may be used individually, or two or more of these examples may be used together.

The concentration of the dispersant in the fibrous carbon nanostructure dispersion liquid is preferably 0.1 mass % or more, and more preferably 0.2 mass % or more, and is preferably 10 mass % or less, and more preferably 5 mass % or less. When the concentration of the dispersant is at least 0.1 mass % and not more than 10 mass %, dispersibility of the fibrous carbon nanostructures can be increased and a carbon film having excellent free-standing ability and electrical conductivity can be obtained while suppressing the influence due to behavior of the dispersant as an impurity.

<Concentration of Fibrous Carbon Nanostructures in Fibrous Carbon Nanostructure Dispersion Liquid>

The concentration of the fibrous carbon nanostructures in the fibrous carbon nanostructure dispersion liquid is preferably 0.005 mass % or more, and more preferably 0.01 mass % or more, and is preferably 5 mass % or less, and more preferably 0.5 mass % or less. A carbon film can be efficiently produced when the concentration of the fibrous carbon nanostructures is 0.005 mass % or more. Moreover, when the concentration of the fibrous carbon nanostructures is 5 mass % or less, aggregation of the fibrous carbon nanostructures can be inhibited and a carbon film having excellent free-standing ability can be obtained.

<Viscosity of Fibrous Carbon Nanostructure Dispersion Liquid>

The viscosity of the fibrous carbon nanostructure dispersion liquid is preferably 0.001 Pa·s or more, and more preferably 0.01 Pa·s or more, and is preferably 0.8 Pa·s or less, and more preferably 0.6 Pa·s or less. When the viscosity of the fibrous carbon nanostructure dispersion liquid is at least 0.001 Pa·s and not more than 0.8 Pa·s, the fibrous carbon nanostructures can be favorably formed into a film in production of a carbon film, properties of the resultant carbon film, such as electrical conductivity, thermal conductivity, and mechanical properties, can be sufficiently increased, and the carbon film can be easily produced. The viscosity of the fibrous carbon nanostructure dispersion liquid can be adjusted, for example, by altering the amount and type of the fibrous carbon nanostructures and the dispersant.

In this disclosure, the viscosity of the fibrous carbon nanostructure dispersion liquid can be measured in accordance with JIS K7117-1 using a B-type viscometer under conditions of a temperature of 23° C., an M4 rotor, and a rotation speed of 60 rpm.

(Method of Producing Fibrous Carbon Nanostructure Dispersion Liquid)

In the presently disclosed method of producing a fibrous carbon nanostructure dispersion liquid, a fibrous carbon nanostructure dispersion liquid is obtained by performing specific dispersion treatment with respect to a coarse dispersion liquid obtained by adding one or more fibrous carbon nanostructures to a solvent. Specifically, one major feature of the presently disclosed method of producing a fibrous carbon nanostructure dispersion liquid is the inclusion of obtaining a fibrous carbon nanostructure dispersion liquid by performing dispersion treatment in which pressure is applied to a coarse dispersion liquid obtained through addition of one or more fibrous carbon nanostructures to a solvent such as to feed the coarse dispersion liquid into a narrow tubular flow path and shear force is imparted on the coarse dispersion liquid to disperse the fibrous carbon nanostructures (dispersion step). In the dispersion treatment of the dispersion step, by pressurizing the coarse dispersion liquid, feeding the coarse dispersion liquid into a narrow tubular flow path, and imparting shear force on the dispersion liquid, the fibrous carbon nanostructures can be dispersed while suppressing damage to the fibrous carbon nanostructures. The pressurizing and feeding of the coarse dispersion liquid to impart shear force on the coarse dispersion liquid in the dispersion treatment can be performed, for example, by causing high-speed flow of the coarse dispersion liquid in a narrow tubular flow path by a freely selected method, such as by spraying the coarse dispersion liquid from a nozzle after the coarse dispersion liquid has been pressurized by a high-pressure pump or the like.

After this dispersion treatment has been performed in the dispersion step of the presently disclosed method of producing a fibrous carbon nanostructure dispersion liquid, the resultant dispersion liquid may be subjected to centrifugal separation to cause sedimentation of some of the fibrous carbon nanostructures (centrifugal separation treatment), treatment may be performed to fractionate a supernatant from the centrifugally separated dispersion liquid (fractionation treatment), and the supernatant may be obtained as a fibrous carbon nanostructure dispersion liquid.

<Coarse Dispersion Liquid>

The coarse dispersion liquid that is used in the presently disclosed method of producing a fibrous carbon nanostructure dispersion liquid may be prepared by adding fibrous carbon nanostructures to a solvent and then optionally mixing the solvent and the fibrous carbon nanostructures under normal pressure using a mixer or the like. The coarse dispersion liquid is preferably prepared by a treatment method that causes as little damage as possible to the fibrous carbon nanostructures. No specific limitations are placed on the solvent and any of the solvents previously described in relation to the presently disclosed method of producing a carbon film may be used. Moreover, no specific limitations are placed on the fibrous carbon nanostructures and any of the fibrous carbon nanostructures previously described in relation to the presently disclosed carbon film may be used.

The coarse dispersion liquid may optionally contain additives, such as a dispersant.

<Narrow Tubular Flow Path>

The narrow tubular flow path into which the coarse dispersion liquid is fed may be a single narrow tubular flow path or may be a plurality of narrow tubular flow paths that have a confluence at a freely selected downstream position. However, from a viewpoint of causing effective collisions of the coarse dispersion liquid to impart shear force, it is preferable that the narrow tubular flow path into which the coarse dispersion liquid is fed is a plurality of narrow tubular flow paths having a confluence at a freely selected downstream position.

Although the diameter of the narrow tubular flow path into which the coarse dispersion liquid is fed is not specifically limited, from a viewpoint of effectively imparting high-speed flow shear on the coarse dispersion liquid without clogging of the coarse dispersion liquid, the diameter is preferably at least 50 µm and not more than 500 µm, more preferably at least 50 µm and not more than 300 µm, and even more preferably at least 50 µm and not more than 200 µm.

Specific examples of the presently disclosed method of producing a fibrous carbon nanostructure dispersion liquid include a first disclosed method of producing a fibrous carbon nanostructure dispersion liquid (hereinafter, also referred to simply as the "first production method") and a second disclosed method of producing a fibrous carbon nanostructure dispersion liquid (hereinafter, also referred to simply as the "second production method").

The following describes the first production method and the second production method in order.

<First Production Method>

In the presently disclosed first production method, the dispersion treatment includes first dispersion treatment in which a pressure of 60 MPa to 250 MPa is applied to the coarse dispersion liquid and second dispersion treatment, performed after the first dispersion treatment, in which a pressure of 5 MPa to 30 MPa is applied to the coarse dispersion liquid. The first dispersion treatment has an average dispersion treatment count $\theta$ of 5 to 30 and the second dispersion treatment has an average dispersion treatment count $\theta$ of 1 to 20.

[Dispersion Treatment]

In the dispersion treatment of the first production method, the coarse dispersion liquid is fed into a narrow tubular flow path by applying pressure thereto and shear force is imparted on the coarse dispersion liquid to disperse the fibrous carbon nanostructures. This dispersion treatment can be performed, for example, using a wet-type jet mill that includes a narrow tubular flow path. In this wet-type jet mill, shock waves can be generated through bursting of vacuum bubbles formed in water when high-energy is imparted on a liquid (referred to as a "cavitation effect") and collision shock can be caused within the narrow tubular flow path amongst the coarse dispersion liquid and/or between the coarse dispersion liquid and the flow path wall of the narrow tubular flow path. These shock waves and collision shocks can improve dispersibility of the fibrous carbon nanostructures in the coarse dispersion liquid.

Examples of methods by which pressure may be applied to the coarse dispersion liquid include, but are not specifically limited to, a method in which pressure is applied to the coarse dispersion liquid by a high-pressure pump and a method in which a cylinder having a piston structure is provided upstream of a narrow tubular flow path in a wet-type jet mill, an amount of the coarse dispersion liquid equal to the capacity of the cylinder is loaded, and the piston is pushed out at a specific pressure. In the latter of these method, the coarse dispersion liquid can be fed into the narrow tubular flow path in a substantially continuous manner through intermittent and instantaneous repetition of the pushing out operation of the piston.

Examples of commercially available wet-type jet mills include the products JN5, JN10, JN20, JN100, and JN1000 (each produced by Jokoh Co., Ltd.). However, the dispersion treatment may be performed using a wet-type jet mill other than the products listed above.

More specifically, in the dispersion treatment of the first production method, the coarse dispersion liquid may be repeatedly treated using a dispersing system including a storage tank that stores the coarse dispersion liquid, a wet-type jet mill that is connected such that the coarse dispersion liquid in the storage tank is fed thereto, and a return line that returns treated dispersion liquid flowing out from the wet-type jet mill to the storage tank.

In the first production method, the first dispersion treatment in which a pressure of 60 MPa to 250 MPa is applied to the coarse dispersion liquid is performed for an average dispersion treatment count θ of 5 to 30 and the second dispersion treatment in which a pressure of 5 MPa to 30 MPa is applied to the coarse dispersion liquid is performed for an average dispersion treatment count θ of 1 to 20. As a result, it is possible to obtain a fibrous carbon nanostructure dispersion liquid having the fibrous carbon nanostructures dispersed to a high degree in the solvent.

In the present disclosure, the "average dispersion treatment count θ" of the dispersion treatment refers to the ratio of the amount of the coarse dispersion liquid that is fed into the narrow tubular flow path during the dispersion treatment relative to the total amount of the coarse dispersion liquid. Specifically, the average dispersion treatment count θ can be determined by $$\text{Average dispersion treatment count } \theta = (Q[L/h]/V[L]) \times T[h]$$

where Q[L/h] is the amount of the coarse dispersion liquid that is fed into the narrow tubular flow path per unit time, V[L] is the total amount of the coarse dispersion liquid, and T[h] is the treatment time.

The reason why a fibrous carbon nanostructure dispersion liquid having fibrous carbon nanostructures dispersed to a high degree in a solvent can be obtained by implementing dispersion treatment including first dispersion treatment and second dispersion treatment as described above is not clear. However, it is presumed that by performing dispersion treatment in which the pressure applied to the coarse dispersion liquid is changed in at least two steps, two levels of shear force can be imparted on the coarse dispersion liquid, and, as a result, the fibrous carbon nanostructures can be efficiently dispersed to a high degree.

The pressure applied to the coarse dispersion liquid in the first dispersion treatment is not specifically limited other than being 60 MPa to 250 MPa. However, from a viewpoint of effectively imparting shear force on the coarse dispersion liquid and further improving dispersibility of the fibrous carbon nanostructures, the applied pressure is preferably 60 MPa to 200 MPa, and more preferably 80 MPa to 150 MPa.

Moreover, the average dispersion treatment count θ of the first dispersion treatment is not specifically limited other than being 5 to 30. However, from a viewpoint of enabling effective improvement of dispersibility of the fibrous carbon nanostructures in combination with the second dispersion treatment, the average dispersion treatment count θ is preferably 8 to 28, and more preferably 10 to 25.

The pressure applied to the coarse dispersion liquid in the second dispersion treatment is not specifically limited other than being 5 MPa to 30 MPa. However, from a viewpoint of effectively imparting shear force on the coarse dispersion liquid and further improving dispersibility of the fibrous carbon nanostructures, the applied pressure is preferably 10 MPa to 28 MPa, and more preferably 15 MPa to 25 MPa.

Moreover, the average dispersion treatment count θ of the second dispersion treatment is not specifically limited other than being 1 to 20. However, from a viewpoint of enabling effective improvement of dispersibility of the fibrous carbon nanostructures in combination with the first dispersion treatment, the average dispersion treatment count θ is preferably 5 to 15, and more preferably 5 to 10.

<Second Production Method>

A feature of the presently disclosed second production method is that, in the dispersion treatment, a pressure of 50 MPa to 250 MPa is applied to the coarse dispersion liquid, back pressure is applied to the coarse dispersion liquid on which shear force has been imparted, back pressure of the coarse dispersion liquid on which shear force has been imparted is reduced in at least two steps, and the dispersion treatment has an average dispersion treatment count θ of 3 to 20.

[Dispersion Treatment]

Figure 1:
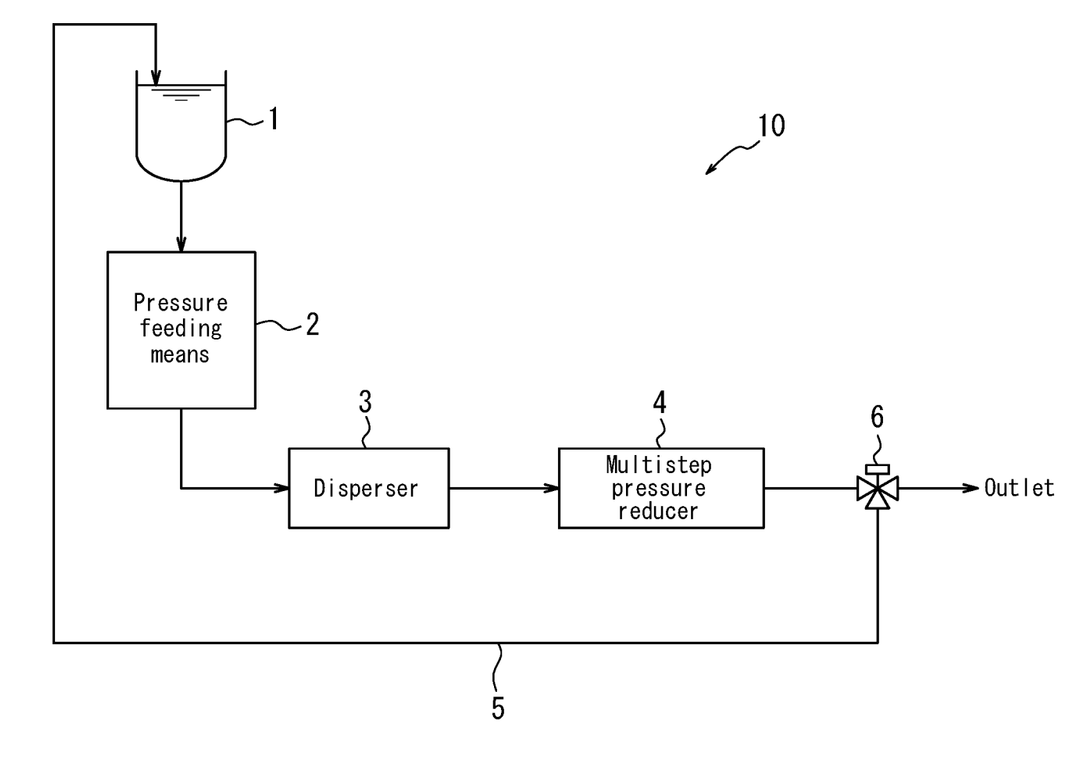
FIG. 1 illustrates an overview of configuration of a dispersing system that can be used in a representative method of producing a fibrous carbon nanostructure dispersion liquid according to this disclosure.

In the dispersion treatment of the second production method, the coarse dispersion liquid is fed into a narrow tubular flow path by applying pressure thereto and shear force is imparted on the coarse dispersion liquid to disperse the fibrous carbon nanostructures. At this time, back pressure is applied to the coarse dispersion liquid on which shear force has been imparted, and back pressure of the coarse dispersion liquid is reduced. This dispersion treatment can be performed, for example, using a dispersing system 10 configured as illustrated in FIG. 1. However, a dispersing system other than the dispersing system 10 may alternatively be used.

The dispersing system 10 illustrated in FIG. 1 includes a storage tank 1 for storing the coarse dispersion liquid, a pressure feeding means 2 for applying pressure to the coarse dispersion liquid stored in the tank 1 and feeding the pressurized coarse dispersion liquid to a disperser 3 including a narrow tubular flow path that disperses the fibrous carbon nanostructures contained in the pressurized coarse dispersion liquid. The dispersing system 10 also includes a multistep pressure reducer 4 that reduces, in multiple steps, the pressure (back pressure) of a dispersion liquid obtained from the disperser 3. The dispersing system 10 further includes a return line 5 for returning dispersion liquid that has been depressurized by the multistep pressure reducer 4 to the tank 1 and a flow path switching valve (three-way valve) 6 for switching the flow path of the dispersion liquid that has been depressurized by the multistep pressure reducer 4.

Examples of the pressure feeding means 2 include, but are not specifically limited to, a high-pressure pump and a cylinder having a piston structure that is connectable to the narrow tubular flow path of the disperser 3. In the case of the latter, the coarse dispersion liquid can be fed into the narrow tubular flow path in a substantially continuous manner by intermittently and instantaneously repeating an operation in which the coarse dispersion liquid is loaded in an amount equivalent to the capacity of the cylinder and then the piston is pushed out with a specific force.

In the disperser 3, the inflowing high-pressure coarse dispersion liquid becomes a high-flow rate fluid and flows at high speed as a result of passing through the narrow tubular flow path, and the coarse dispersion liquid receives shear force during this high-speed flow. As a result, the fibrous carbon nanostructures in the coarse dispersion liquid are favorably dispersed. A dispersion liquid with a lower pressure (back pressure) than the pressure of the inflowing coarse dispersion liquid flows out from a terminal section of the disperser 3.

The back pressure on the coarse dispersion liquid on which shear force has been imparted can be applied by applying a load to the flow of the coarse dispersion liquid. For example, a desired back pressure may be applied to the coarse dispersion liquid on which shear force has been imparted by providing the subsequently described multistep pressure reducer 4 downstream of the disperser 3. The disperser 3 may include a heat exchanger or a cooling liquid supply mechanism for cooling the coarse dispersion liquid.

As a result of back pressure being applied when shear force is imparted on the coarse dispersion liquid in the disperser 3 to disperse the fibrous carbon nanostructures, formation of air bubbles in the liquid caused by a decrease in pressure can be inhibited compared to a case in which back pressure is not applied. Consequently, it is possible to inhibit damage to the fibrous carbon nanostructures caused by cavitation (formation and bursting of air bubbles), and particularly damage to the fibrous carbon nanostructures caused by shock waves when air bubbles burst. Moreover, adhesion of air bubbles to the fibrous carbon nanostructures and energy loss due to air bubble formation can be inhibited and the fibrous carbon nanostructures can be dispersed homogeneously and efficiently.

Note that a narrow tubular flow path having a sufficient internal diameter relative to the size of the fibrous carbon nanostructures is used in the above-described disperser 3, and thus the flow path is unlikely to be blocked by the fibrous carbon nanostructures even when a high concentration coarse dispersion liquid having a high fibrous carbon nanostructure content (for example, a coarse dispersion liquid having a fibrous carbon nanostructure concentration of 0.5 parts by mass or more) is used.

The pressure applied to the coarse dispersion liquid in the dispersion treatment is not specifically limited other than being 50 MPa to 250 MPa. However, from a viewpoint of effectively imparting shear force on the coarse dispersion liquid and further improving dispersibility of the fibrous carbon nanostructures, the applied pressure is preferably 60 MPa to 200 MPa, and more preferably 80 MPa to 150 MPa.

Moreover, the average dispersion treatment count $\theta$ of the dispersion treatment is not specifically limited other than being 3 to 20. However, from a viewpoint of effectively improving dispersibility of the fibrous carbon nanostructures, the average dispersion treatment count $\theta$ is preferably 5 to 18, and more preferably 8 to 15.

In the dispersion treatment of the second production method, back pressure of the coarse dispersion liquid on which shear force has been imparted is reduced in at least two steps. This pressure reduction can be performed, for example, by the multistep pressure reducer 4 illustrated in FIG. 1. By reducing back pressure of the coarse dispersion liquid on which shear force has been imparted in at least two steps, the formation of air bubbles in the fibrous carbon nanostructure dispersion liquid when the fibrous carbon nanostructure dispersion liquid is released to atmospheric pressure at an outlet of the dispersing system 10 can be inhibited, and thus damage to the fibrous carbon nanostructures can be inhibited. From a viewpoint of sufficiently inhibiting the formation of air bubbles in the fibrous carbon nanostructure dispersion liquid and inhibiting damage to the fibrous carbon nanostructures, it is preferable that the back pressure is reduced to a pressure such that air bubbles are not formed when the fibrous carbon nanostructure dispersion liquid is released to atmospheric pressure.

The fibrous carbon nanostructure dispersion liquid that is finally discharged from the multistep pressure reducer 4 can be collected by using the flow path switching valve (three-way valve) 6 to switch the flow path of the fibrous carbon nanostructure dispersion liquid toward the outlet of the dispersing system 10. Note that in a situation in which dispersion of the fibrous carbon nanostructures is insufficient, the flow path switching valve (three-way valve) 6 may optionally be used to switch the flow path of the fibrous carbon nanostructure dispersion liquid to the return line 5, and the fibrous carbon nanostructure dispersion liquid may be circulated and subjected to dispersion treatment again.

Examples of dispersing systems configured as set forth above that may be used include a dispersing system that is commercially available as the product "BERYU SYSTEM PRO" (produced by Beryu Corp.). The presently disclosed second production method can be performed by appropriately setting dispersion conditions in accordance with operating instructions of the dispersing system.

<Centrifugal Separation Treatment and Fractionation Treatment>

After dispersion treatment has been performed in the dispersion step of the presently disclosed first and second production methods, the resultant dispersion liquid may be subjected to centrifugal separation to cause sedimentation of some of the fibrous carbon nanostructures (centrifugal separation treatment), treatment may be performed to fractionate a supernatant from the centrifugally separated dispersion liquid (fractionation treatment), and the supernatant may be obtained as a fibrous carbon nanostructure dispersion liquid.

[Centrifugal Separation Treatment]

The centrifugal separation of the dispersion liquid obtained through dispersion treatment is not specifically limited and may be performed using a known centrifugal separator.

From a viewpoint of causing fibrous carbon nanostructures having excellent dispersibility to remain in the resultant supernatant to an appropriate degree and obtaining a carbon film having excellent strength and free-standing ability, the centrifugal acceleration in centrifugal separation of the fibrous carbon nanostructure dispersion liquid is preferably 2,000 G or more, and more preferably 5,000 G or more, and is preferably 20,000 G or less, and more preferably 15,000 G or less.

Moreover, from a viewpoint of causing fibrous carbon nanostructures having excellent dispersibility to remain in the resultant supernatant to an appropriate degree and obtaining a carbon film having excellent strength and free-standing ability, the centrifugal separation time in centrifugal separation of the fibrous carbon nanostructure dispersion liquid is preferably 20 minutes or more, and more preferably 30 minutes or more, and is preferably 120 minutes or less, and more preferably 90 minutes or less.

[Fractionation Treatment]

Next, fractionation of the supernatant from the centrifugally separated dispersion liquid can be performed by decantation, pipetting, or the like to leave a sediment layer and collect the supernatant. Specifically, a supernatant that, for example, is present in a section from the liquid surface of the centrifugally separated dispersion liquid to 5/6 of the depth of the dispersion liquid may be collected.

The supernatant that is fractionated from the centrifugally separated dispersion liquid contains fibrous carbon nanostructures that did not sediment in the centrifugal separation. Therefore, the dispersion rate (%) of the supernatant as determined by B/A×100 is high. Moreover, a carbon film having even better glossiness (i.e., a carbon film having even better electrical conductivity) can be obtained by using this supernatant as a fibrous carbon nanostructure dispersion liquid.

EXAMPLES

The following provides a more specific description of this disclosure based on examples. However, this disclosure is not limited to the following examples. In the following description, "%", "ppm", and "parts" used to indicate quantities are by mass, unless otherwise specified.

The following methods were used to perform various measurements in the examples and comparative examples.

<BET Specific Surface Area of Fibrous Carbon Nanostructures>

A cell designated for use in a fully automatic specific surface area measurement device (produced by Mountech Co., Ltd.; product name: Macsorb® HM model-1210 (Macsorb is a registered trademark in Japan, other countries, or both)) was sufficiently dried through at least 5 hours of heat treatment at 110° C. Thereafter, 20 mg of fibrous carbon nanostructures were weighed out and loaded into the cell. The cell was then set at a specific position in the measurement device and the BET specific surface area was measured by an automatic operation. The principle of measurement of this device is in accordance with a method in which an adsorption isotherm of liquid nitrogen at 77 K is measured and then the specific surface area is measured from the adsorption isotherm by the BET (Brunauer-Emmett-Teller) method.

<t-Plot of Fibrous Carbon Nanostructures>

A t-plot was measured through conversion of relative pressure to average nitrogen gas adsorption layer thickness t (nm) in the adsorption isotherm obtained in measurement of the BET specific surface area described above. The principle of measurement of the t-plot is in accordance with the t-plot method of de Boer et al.

<Average Diameter (Av) of Fibrous Carbon Nanostructures>

A dispersion liquid was obtained by weighing out 0.1 mg of fibrous carbon nanostructures and 3 mL of ethanol into a 10 mL screw vial, and subjecting the entire screw vial to ultrasonic treatment using an ultrasonic cleaner (produced by BRANSON; product name: 5510J-DTH) with a vibration power of 180 W, a temperature of 10° C. to 40° C., and a treatment time of 30 minutes to homogeneously disperse the fibrous carbon nanostructures in the ethanol. Next, 50 μL of the obtained dispersion liquid was dripped onto a micro grid for a transmission electron microscope (produced by Okenshoji Co., Ltd.; product name: Micro Grid Type A STEM 150 Cu Grid), was then left to stand for at least 1 hour, and was further vacuum dried for at least 5 hours at 25° C. such that the fibrous carbon nanostructures were held on the micro grid. The micro grid was then set in a transmission electron microscope (produced by Topcon Technohouse Corporation; product name: EM-002B) and the fibrous carbon nanostructures were observed at ×1,500,000 magnification.

Note that the fibrous carbon nanostructures were observed at 10 random locations on the micro grid. At each of these locations, 10 fibrous carbon nanostructures were selected at random and the diameters of these fibrous carbon nanostructures were measured. The average value for all 100 of the measured nanostructures was calculated as the average diameter (Av) of the fibrous carbon nanostructures.

<Light Absorbance>

A dispersion liquid was loaded into a designated liquid measurement cell of 1 mm in width and the absorbance of light having a wavelength of 500 nm was measured using a spectrophotometer (produced by JASCO Corporation; product name: U-670).

<Thickness of Carbon Film>

The thickness of a carbon film was measured using a micrometer (produced by Mitutoyo Corporation; product name: 293 Series MDH-25).

<Film Surface Glossiness at 60°>

A carbon film was shaped to obtain a square shape having a side length of approximately 30 mm. The film surface glossiness of the carbon film at 60° was measured using a glossiness meter (Handy Glossiness Meter Gloss Checker produced by Horiba, Ltd.; wavelength 890 nm).

<Electrical Conductivity of Carbon Film>

A carbon film was shaped to obtain a square shape having a side length of approximately 30 mm. Thereafter, four square-shaped test specimens of 10 mm×10 mm were cut out from the carbon film and were used as measurement samples. Next, each of the measurement samples was secured to an insulating board, a probe of a low resistivity meter (produced by Mitsubishi Chemical Analytech Co., Ltd.; product name: Loresta GX MCP-T700; PSP probe selected as four-pin probe) was pressed against a central position of the measurement sample (position 5 mm longitudinally and 5 mm laterally), and the electrical conductivity was measured by applying a voltage of 10 V. The electrical conductivities of the four measurement samples were measured and the average value of the measured values was defined as the electrical conductivity of the carbon film.

Example 1

<Production of Fibrous Carbon Nanostructures>

SGCNTs (CNTs 1) were synthesized as fibrous carbon nanostructures in accordance with the super growth method described in JP 4,621,896 B under the following conditions.

Feedstock carbon compound: Ethylene; feed rate 50 sccm
Atmosphere (gas): Helium/hydrogen mixed gas; feed rate 1,000 sccm
Pressure: 1 atm
Water vapor additive amount: 300 ppm
Reaction temperature: 750° C.
Reaction time: 10 minutes
Metal catalyst: Iron thin film (thickness 1 nm)
Substrate: Silicon wafer The resultant CNTs 1 had a BET specific surface area of 1,050 $m^2/g$ and exhibited a convex upward shape in a t-plot. When the CNTs 1 were measured by a Raman spectrophotometer, a radial breathing mode (RBM) spectrum was observed in a low-frequency region of 100 $cm^{-1}$ to 300 $cm^{-1}$ that is characteristic of single-walled carbon nanotubes. Moreover, the CNTs 1 had an average diameter (Av) of 3.3 nm.

<Production of Fibrous Carbon Nanostructure Dispersion Liquid>

A coarse dispersion liquid was obtained by adding 2.0 g of the CNTs 1 to 1,000 mL of an aqueous solution of 0.5 mass % in concentration containing sodium deoxycholate (DOC) as a dispersant. The coarse dispersion liquid containing the CNTs 1 and the dispersant was loaded into a multistep pressure reduction-type high-pressure homogenizer (produced by Beryu Corp.; product name: BERYU SYSTEM PRO) including a high-pressure dispersion treatment section having a narrow tubular flow path section with a diameter of 200 and a multistep pressure control device (multistep pressure reducer) linked to the high-pressure dispersion treatment section. The coarse dispersion liquid was fed into the narrow tubular flow path by intermittently and instantaneously applying a pressure of 120 MPa to the coarse dispersion liquid, and was subjected to dispersion treatment. In this dispersion treatment, treated dispersion liquid flowing out from the high-pressure homogenizer was returned to the high-pressure homogenizer. The dispersion treatment was continued until the average dispersion treatment count θ reached 10. In this manner, a CNT dispersion liquid 1 was obtained as a fibrous carbon nanostructure dispersion liquid.

The light absorbance (A) of the resultant CNT dispersion liquid 1 was measured to be 1.72. Next, the CNT dispersion liquid 1 was subjected to centrifugal separation for 1 hour at 10,000 G using an ultracentrifuge (produced by Hitachi Koki Co., Ltd.; product name: himac CS150NX). The light absorbance (B) of the supernatant obtained after the centrifugal separation was measured to be 1.67. Based on these results, the CNT dispersion liquid 1 had a dispersion rate determined by B/A×100 of 97.1%.

<Formation of Carbon Film>

A vacuum filtration device equipped with a 90 mmØ membrane filter having an opening size of 0.1 µm as a porous substrate for film formation was used to filter 50 mL of the CNT dispersion liquid 1 at 0.09 MPa. After the filtration, 100 mL of methanol and 100 mL of water were passed through the vacuum filtration device to wash a carbon film formed on the membrane filter, and then air was passed through the device for 15 minutes. Next, the produced carbon film/membrane filter was immersed in ethanol and then a carbon film 1 in a wet state was removed from the membrane filter by peeling. The removed carbon film 1 was vacuum dried in a vacuum dryer for 24 hours at 100° C. to remove volatile content and obtain a carbon film 1. The resultant carbon film 1 had a thickness of 50 µm, a film surface glossiness at 60° of 27, and an electrical conductivity of 330 S/cm. The carbon film 1 was an extremely glossy film having high electrical conductivity.

Example 2

A CNT dispersion liquid 2 (fibrous carbon nanostructure dispersion liquid) and a carbon film 2 were obtained in the same way as in Example 1 with the exception that in production of a fibrous carbon nanostructure dispersion liquid as in Example 1, the dispersion treatment was performed such that the pressure applied to the coarse dispersion liquid was 250 MPa and the average dispersion treatment count θ was 5.

The CNT dispersion liquid 2 had a dispersion rate of 93.2%. The carbon film 2 had a thickness of 47 µm, a film surface glossiness at 60° of 15, and an electrical conductivity of 250 S/cm.

Example 3

A CNT dispersion liquid 3 (fibrous carbon nanostructure dispersion liquid) and a carbon film 3 were obtained in the same way as in Example 1 with the exception that in production of a fibrous carbon nanostructure dispersion liquid as in Example 1, the dispersion treatment was performed such that the pressure applied to the coarse dispersion liquid was 50 MPa and the average dispersion treatment count θ was 20.

The CNT dispersion liquid 3 had a dispersion rate of 97.2%. The resultant carbon film 3 had a thickness of 52 µm, a film surface glossiness at 60° of 28, and an electrical conductivity of 340 S/cm.

Example 4

A CNT dispersion liquid 4 (fibrous carbon nanostructure dispersion liquid) and a carbon film 4 were obtained in the same way as in Example 1 with the exception that CNTs 2 (produced by JEIO Co., Ltd.; product name: JC-142) were used instead of the CNTs 1 used in Example 1.

The CNTs 2 had a BET specific surface area of 500 m²/g, exhibited a convex upward shape in a t-plot, and had an average diameter (Av) of 9.5 nm. A radial breathing mode (RBM) spectrum was not observed in measurement of the CNTs 2 by a Raman spectrophotometer. Moreover, it was confirmed that the CNTs 2 were multi-walled carbon nanotubes through observation using a transmission electron microscope.

The CNT dispersion liquid 4 had a dispersion rate of 95.3%. The carbon film 4 had a thickness of 60 µm, a film surface glossiness at 60° of 18, and an electrical conductivity of 140 S/cm.

Example 5

A CNT dispersion liquid 5 (fibrous carbon nanostructure dispersion liquid) and a carbon film 5 were obtained in the same way as in Example 1 with the exception that in production of a fibrous carbon nanostructure dispersion liquid as in Example 1, instead of using a multistep pressure reduction-type high-pressure homogenizer, a wet-type jet mill dispersing device (produced by Jokoh Co., Ltd.; product name: JN-20) having two narrow tubular flow path sections (two converging flow paths) of 200 µm in diameter and capable of dispersion treatment in which a dispersing effect is achieved by high-speed flow shear, cavitation effect, and collision shock was used, first dispersion treatment in which a pressure of 200 MPa was applied to the coarse dispersion liquid was performed for an average dispersion treatment count θ of 10, and subsequently second dispersion treatment in which a pressure of 15 MPa was applied to the coarse dispersion liquid was performed for an average dispersion treatment count θ of 5.

The CNT dispersion liquid 5 had a dispersion rate of 85.5%. The carbon film 5 had a thickness of 47 µm, a film surface glossiness at 60° of 10, and an electrical conductivity of 150 S/cm.

Example 6

A CNT dispersion liquid 6 (fibrous carbon nanostructure dispersion liquid) and a carbon film 6 were obtained in the same way as in Example 5 with the exception that in production of a fibrous carbon nanostructure dispersion liquid as in Example 5, first dispersion treatment in which a pressure of 60 MPa was applied to the coarse dispersion liquid was performed for an average dispersion treatment count θ of 25, and subsequently second dispersion treatment in which a pressure of 25 MPa was applied to the coarse dispersion liquid was performed for an average dispersion treatment count θ of 10.

The CNT dispersion liquid 6 had a dispersion rate of 84.9%. The carbon film 6 had a thickness of 52 µm, a film surface glossiness at 60° of 4, and an electrical conductivity of 155 S/cm.

Example 7

A carbon film 7 was obtained in the same way as in Example 6 with the exception that in formation of a carbon film as in Example 6, the CNT dispersion liquid 6 was subjected to centrifugal separation for 1 hour at 2,000 G and the resulting supernatant was used as a CNT dispersion liquid 7 instead of using the CNT dispersion liquid 6.

The CNT dispersion liquid 7 had a dispersion rate of 98.5%. The carbon film 7 had a thickness of 40 µm, a film surface glossiness at 60° of 30, and an electrical conductivity of 360 S/cm.

Comparative Example 1

A CNT dispersion liquid 8 and a carbon film 8 were obtained in the same way as in Example 1 with the exception that in production of a fibrous carbon nanostructure dispersion liquid as in Example 1, the dispersion treatment was performed such that the average dispersion treatment count θ was 1.

The CNT dispersion liquid 8 had a dispersion rate of 30.2%. The carbon film 8 had a thickness of 70 µm, a film surface glossiness at 60° of 0.5, and an electrical conductivity of 60 S/cm.

Comparative Example 2

A CNT dispersion liquid 9 and a carbon film 9 were obtained in the same way as in Example 1 with the exception that in production of a fibrous carbon nanostructure dispersion liquid as in Example 1, the pressure applied to the coarse dispersion liquid was 40 MPa.

The CNT dispersion liquid 9 had a dispersion rate of 70.2%. The carbon film 9 had a thickness of 68 µm, a film surface glossiness at 60° of 1.0, and an electrical conductivity of 78 S/cm.

Comparative Example 3

A CNT dispersion liquid 10 and a carbon film 10 were obtained in the same way as in Example 6 with the exception that in production of a fibrous carbon nanostructure dispersion liquid as in Example 6, the pressure applied to the coarse dispersion liquid in the first dispersion treatment was 40 MPa.

The CNT dispersion liquid 10 had a dispersion rate of 73.0%. The carbon film 10 had a thickness of 55 µm, a film surface glossiness at 60° of 1.5, and an electrical conductivity of 85 S/cm.

Comparative Example 4

A CNT dispersion liquid 11 and a carbon film 11 were obtained in the same way as in Example 6 with the exception that in production of a fibrous carbon nanostructure dispersion liquid as in Example 6, first dispersion treatment in which a pressure of 60 MPa was applied to the coarse dispersion liquid was performed for an average dispersion treatment count θ of 35, and subsequent second dispersion treatment was not performed.

The CNT dispersion liquid 11 had a dispersion rate of 65.8%. The carbon film 11 had a thickness of 58 µm, a film surface glossiness at 60° of 0.8, and an electrical conductivity of 79 S/cm.

Comparative Example 5

A CNT dispersion liquid 12 and a carbon film 12 were obtained in the same way as in Comparative Example 1 with the exception that CNTs 3 (produced by Nanocyl SA; product name: NC7000) were used instead of the CNTs 1 used in Comparative Example 1.

The CNTs 3 had a BET specific surface area of 265 m$^2$/g, exhibited a convex downward shape in a t-plot, and had an average diameter (Av) of 10.1 nm. A radial breathing mode (RBM) spectrum was not observed in measurement of the CNTs 3 by a Raman spectrophotometer. Moreover, it was confirmed that the CNTs 3 were multi-walled carbon nanotubes through observation using a transmission electron microscope.

The CNT dispersion liquid 12 had a dispersion rate of 35.5%. The carbon film 12 had a thickness of 47 µm, a film surface glossiness at 60° of 0.1, and an electrical conductivity of 8 S/cm.

Example 8

In formation of a carbon film as in Example 6, the CNT dispersion liquid 6 was used to obtain a carbon film 13 of a different thickness to the carbon film 6. The carbon film 13 had a thickness of 6 µm, a surface glossiness at 60° of 150, and an electrical conductivity of 540 S/cm.

Example 9

In formation of a carbon film as in Example 6, the CNT dispersion liquid 6 was used to obtain a carbon film 14 of a different thickness to the carbon film 6. The carbon film 14 had a thickness of 33 µm, a film surface glossiness at 60° of 125, and an electrical conductivity of 300 S/cm.

The various conditions and results of the various measurements in the above-described examples and comparative examples are shown in Tables 1 and 2.

TABLE 1

| | | Example 1 | Example 2 | Example 3 | Example 4 |
|---|---|---|---|---|---|
| Fibrous carbon nanostructures | Designation | CNTs 1 | CNTs 1 | CNTs 1 | CNTs 2 |
| | Type | Single-walled carbon nanotubes | Single-walled carbon nanotubes | Single-walled carbon nanotubes | Multi-walled carbon nanotubes |
| | Average diameter (Av) [nm] | 3.3 | 3.3 | 3.3 | 9.5 |
| | BET specific surface area [m$^2$/g] | 1050 | 1050 | 1050 | 500 |
| | t-Plot | Convex upward | Convex upward | Convex upward | Convex upward |
| Production of fibrous carbon nanostructure dispersion liquid | Back pressure application | Yes | Yes | Yes | Yes |
| | Pressure applied to coarse dispersion liquid [MPa] | 120 | 250 | 50 | 120 |
| | Average treatment count (θ) | 10 | 5 | 20 | 10 |
| Fibrous carbon nanostructure dispersion liquid | Designation | CNT dispersion liquid 1 | CNT dispersion liquid 2 | CNT dispersion liquid 3 | CNT dispersion liquid 4 |
| | Dispersion rate [%] | 97.1 | 93.2 | 97.2 | 95.3 |

TABLE 1-continued

| Carbon film | Designation | | Carbon film 1 | Carbon film 2 | Carbon film 3 | Carbon film 4 |
|---|---|---|---|---|---|---|
| | Thickness [μm] | | 50 | 47 | 52 | 60 |
| | Film surface glossiness at 60° | | 27 | 15 | 28 | 18 |
| | Electrical conductivity [S/cm] | | 330 | 250 | 340 | 140 |

| | | | Example 5 | Example 6 | Example 7 |
|---|---|---|---|---|---|
| Fibrous carbon nanostructures | Designation | | CNTs 1 | CNTs 1 | CNTs 1 |
| | Type | | Single-walled carbon nanotubes | Single-walled carbon nanotubes | Single-walled carbon nanotubes |
| | Average diameter (Av) [nm] | | 3.3 | 3.3 | 3.3 |
| | BET specific surface area [m²/g] | | 1050 | 1050 | 1050 |
| | t-Plot | | Convex upward | Convex upward | Convex upward |
| Production of fibrous carbon nanostructure dispersion liquid | Back pressure application | | No | No | Centrifugal separation treatment and fractionation treatment of CNT dispersion liquid 6 |
| | Pressure applied to coarse dispersion liquid [MPa] | | 200/15 | 60/25 | |
| | Average treatment count (θ) | | 10/5 | 25/10 | |
| Fibrous carbon nanostructure dispersion liquid | Designation | | CNT dispersion liquid 5 | CNT dispersion liquid 6 | CNT dispersion liquid 7 |
| | Dispersion rate [%] | | 85.5 | 84.9 | 98.5 |
| Carbon film | Designation | | Carbon film 5 | Carbon film 6 | Carbon film 7 |
| | Thickness [μm] | | 47 | 52 | 40 |
| | Film surface glossiness at 60° | | 10 | 4 | 30 |
| | Electrical conductivity [S/cm] | | 150 | 155 | 360 |

TABLE 2

| | | Example 8 | Example 9 | Comparative Example 1 | Comparative Example 2 |
|---|---|---|---|---|---|
| Fibrous carbon nanostructures | Designation | CNTs 1 | CNTs 1 | CNTs 1 | CNTs 1 |
| | Type | Single-walled carbon nanotubes | Single-walled carbon nanotubes | Single-walled carbon nanotubes | Single-walled carbon nanotubes |
| | Average diameter (Av) [nm] | 3.3 | 3.3 | 3.3 | 3.3 |
| | BET specific surface area [m²/g] | 1050 | 1050 | 1050 | 1050 |
| | t-Plot | Convex upward | Convex upward | Convex upward | Convex upward |
| Production of fibrous carbon nanostructure dispersion liquid | Back pressure application | No | No | Yes | Yes |
| | Pressure applied to coarse dispersion liquid [MPa] | 60/25 | 60/25 | 120 | 40 |
| | Average treatment count (θ) | 25/10 | 25/10 | 1 | 10 |
| Fibrous carbon nanostructure dispersion liquid | Designation | CNT dispersion liquid 6 | CNT dispersion liquid 6 | CNT dispersion liquid 8 | CNT dispersion liquid 9 |
| | Dispersion rate [%] | 84.9 | 84.9 | 30.2 | 70.2 |
| Carbon film | Designation | Carbon film 13 | Carbon film 14 | Carbon film 8 | Carbon film 9 |
| | Thickness [μm] | 6 | 33 | 70 | 68 |
| | Film surface glossiness at 60° | 150 | 125 | 0.5 | 1.0 |
| | Electrical conductivity [S/cm] | 540 | 300 | 60 | 78 |

| | | | Comparative Example 3 | Comparative Example 4 | Comparative Example 5 |
|---|---|---|---|---|---|
| Fibrous carbon nanostructures | Designation | | CNTs 1 | CNTs 1 | CNTs 3 |
| | Type | | Single-walled carbon nanotubes | Single-walled carbon nanotubes | Multi-walled carbon nanotubes |
| | Average diameter (Av) [nm] | | 3.3 | 3.3 | 10.1 |
| | BET specific surface area [m²/g] | | 1050 | 1050 | 265 |
| | t-Plot | | Convex upward | Convex upward | Convex downward |
| Production of fibrous carbon nanostructure dispersion liquid | Back pressure application | | No | No | Yes |
| | Pressure applied to coarse dispersion liquid [MPa] | | 40/25 | 60 | 120 |
| | Average treatment count (θ) | | 25/10 | 35 | 1 |

TABLE 2-continued

| Fibrous carbon nanostructure dispersion liquid | Designation | CNT dispersion liquid 10 | CNT dispersion liquid 11 | CNT dispersion liquid 12 |
|---|---|---|---|---|
| | Dispersion rate [%] | 73.0 | 65.8 | 35.5 |
| Carbon film | Designation | Carbon film 10 | Carbon film 11 | Carbon film 12 |
| | Thickness [μm] | 55 | 58 | 47 |
| | Film surface glossiness at 60° | 1.5 | 0.8 | 0.1 |
| | Electrical conductivity [S/cm] | 85 | 79 | 8 |

It can be seen from Tables 1 and 2 that in the case of carbon films of the examples, which each had a film surface glossiness at 60° of at least 2 and not more than 500, the carbon films had an electrical conductivity of more than 100 S/cm and were similar in nature to a metal, whereas in the case of carbon films of the comparative examples, which each had a glossiness of less than 2, the carbon films had inadequate electrical conductivity of one order lower despite the same materials as the carbon films of the examples being used.

Moreover, it is clear that in order to form a carbon film having a film surface glossiness at 60° of at least 2 and not more than 500, it is necessary to use a fibrous carbon nanostructure dispersion liquid having a dispersion rate of 80% or more, and that production of such a fibrous carbon nanostructure dispersion liquid cannot be achieved through a dispersion method within a commonly known range and can only be achieved once dispersion treatment is performed within a specific range.

INDUSTRIAL APPLICABILITY

According to this disclosure, it is possible to provide a carbon film having excellent electrical conductivity and a method of producing this carbon film.

Moreover, according to this disclosure, it is possible to provide a fibrous carbon nanostructure dispersion liquid with which a carbon film having excellent electrical conductivity can be obtained and a method of producing this fibrous carbon nanostructure dispersion liquid.

REFERENCE SIGNS LIST 1 tank
2 pressure feeding means
3 disperser
4 multistep pressure reducer
5 return line
6 flow path switching valve (three-way valve)
10 dispersing system

The invention claimed is:

1. A carbon film having a film surface glossiness at 60° of at least 2 and not more than 500, wherein
the carbon film comprises one or more fibrous carbon nanostructures,
the fibrous carbon nanostructures have an average structure length of at least 100 μm and not more than 5,000 μm, and
a content of the fibrous carbon nanostructures in the carbon film is 75 mass % or more.

2. The carbon film according to claim 1, wherein
the fibrous carbon nanostructures exhibit a convex upward shape in a t-plot obtained from an adsorption isotherm.

3. A method of producing the carbon film according to claim 1, comprising forming a carbon film by removing a solvent from a fibrous carbon nanostructure dispersion liquid containing the solvent and the fibrous carbon nanostructures.

4. The method of producing a carbon film according to claim 3, wherein
the fibrous carbon nanostructure dispersion liquid has a dispersion rate (%) of 80% or more as determined by B/A×100, where A is light absorbance of the fibrous carbon nanostructure dispersion liquid and B is light absorbance of a supernatant obtained upon subjecting the fibrous carbon nanostructure dispersion liquid to centrifugal separation for 1 hour at 10,000 G.

5. The method of producing a carbon film according to claim 3, wherein
the fibrous carbon nanostructures exhibit a convex upward shape in a t-plot obtained from an adsorption isotherm.

6. A fibrous carbon nanostructure dispersion liquid comprising one or more fibrous carbon nanostructures and a solvent, wherein
the fibrous carbon nanostructures have an average structure length of at least 100 μm and not more than 5,000 μm, and
the fibrous carbon nanostructure dispersion liquid has a dispersion rate (%) of 80% or more as determined by B/A×100, where A is light absorbance of the fibrous carbon nanostructure dispersion liquid and B is light absorbance of a supernatant obtained upon subjecting the fibrous carbon nanostructure dispersion liquid to centrifugal separation for 1 hour at 10,000 G.

7. The fibrous carbon nanostructure dispersion liquid according to claim 6, wherein
the fibrous carbon nanostructures exhibit a convex upward shape in a t-plot obtained from an adsorption isotherm.

8. The fibrous carbon nanostructure dispersion liquid according to claim 6, further comprising a dispersant.

9. A method of producing a fibrous carbon nanostructure dispersion liquid, comprising obtaining a fibrous carbon nanostructure dispersion liquid by performing dispersion treatment in which pressure is applied to a coarse dispersion liquid obtained through addition of one or more fibrous carbon nanostructures to a solvent such as to feed the coarse dispersion liquid into a narrow tubular flow path and shear force is imparted on the coarse dispersion liquid to disperse the fibrous carbon nanostructures, wherein
the dispersion treatment includes first dispersion treatment in which a pressure of 60 MPa to 250 MPa is applied to the coarse dispersion liquid and second dispersion treatment in which a pressure of 5 MPa to 30 MPa is applied to the coarse dispersion liquid, and
the first dispersion treatment has an average dispersion treatment count θ of 5 to 30 and the second dispersion treatment has an average dispersion treatment count θ of 1 to 20.

* * * * *